(12) United States Patent
Miller et al.

(10) Patent No.: US 10,309,730 B2
(45) Date of Patent: Jun. 4, 2019

(54) MINI-CHANNEL HEAT EXCHANGER TUBE SLEEVE

(71) Applicant: Hamilton Sundstrand Corporation, Windsor Locks, CT (US)

(72) Inventors: Matthew William Miller, Enfield, CT (US); Anthony DeLugan, Feeding Hills, MA (US); Michael Doe, Jr., Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 147 days.

(21) Appl. No.: 14/740,806

(22) Filed: Jun. 16, 2015

(65) Prior Publication Data
US 2016/0370126 A1   Dec. 22, 2016

(51) Int. Cl.
| | |
|---|---|
| *F28F 9/16* | (2006.01) |
| *F28D 1/053* | (2006.01) |
| *F28F 9/02* | (2006.01) |
| *F28F 9/18* | (2006.01) |
| *F28F 1/02* | (2006.01) |
| *B23P 15/26* | (2006.01) |
| *F28F 1/12* | (2006.01) |

(52) U.S. Cl.
CPC .............. *F28F 9/165* (2013.01); *B23P 15/26* (2013.01); *F28D 1/05391* (2013.01); *F28F 1/022* (2013.01); *F28F 9/0214* (2013.01); *F28F 9/185* (2013.01); *F28F 1/12* (2013.01); *F28F 2225/04* (2013.01); *F28F 2265/10* (2013.01)

(58) Field of Classification Search
CPC .. F28F 9/0282; F28F 2225/04; F28F 2225/08; F28F 9/0202; F28F 9/165; F28F 9/185; F28D 1/05366; F28D 1/05383
See application file for complete search history.

(56) References Cited

U.S. PATENT DOCUMENTS

| | | | | | |
|---|---|---|---|---|---|
| 1,744,932 | A | * | 1/1930 | Swank ...................... | F28F 1/34 285/192 |
| 2,447,259 | A | * | 8/1948 | Lucke ....................... | F28F 9/04 165/178 |
| 3,349,465 | A | * | 10/1967 | La Pan .................. | B21D 39/06 165/178 |

(Continued)

FOREIGN PATENT DOCUMENTS

| | | |
|---|---|---|
| DE | 19608049 A1 | 9/1997 |
| EP | 2159514 A2 | 3/2010 |

(Continued)

OTHER PUBLICATIONS

Extended European Search Report for Application No. 16174732.4, dated Oct. 20, 2016, 7 Pages.

(Continued)

*Primary Examiner* — Hung Q Nguyen
*Assistant Examiner* — Mark L. Greene
(74) *Attorney, Agent, or Firm* — Kinney & Lange, P.A.

(57) ABSTRACT

A heat exchanger tube assembly includes a tube. The tube includes a first end, a second end disposed opposite from the first end, an outer surface, and an inner surface defining an interior space. A plurality of channels are formed within the interior space. A first sleeve is fixed to the outer surface of the tube near the first end and a second sleeve fixed to the outer surface of the tube near the second end.

10 Claims, 8 Drawing Sheets

(56) References Cited

U.S. PATENT DOCUMENTS

| | | | | |
|---|---|---|---|---|
| 3,391,732 A | * | 7/1968 | Murray | F28D 1/0535 165/148 |
| 3,438,430 A | | 4/1969 | Kestemont | |
| 3,496,629 A | * | 2/1970 | Martucci | B23K 1/20 228/168 |
| 3,791,326 A | | 2/1974 | Schwarz | |
| 4,237,968 A | | 12/1980 | Duke | |
| 4,325,425 A | | 4/1982 | Hwang | |
| 6,082,439 A | * | 7/2000 | Kato | F28F 9/0226 165/173 |
| 6,745,827 B2 | * | 6/2004 | Lee | F25B 39/02 165/144 |
| 6,904,965 B2 | * | 6/2005 | Beck | F28D 1/05366 165/153 |
| 6,929,288 B2 | * | 8/2005 | Usui | F02M 55/025 285/122.1 |
| 8,851,157 B2 | * | 10/2014 | Falkingham | F28D 1/05383 165/173 |
| 2011/0090426 A1 | * | 4/2011 | Choi | G02B 6/009 349/65 |
| 2012/0151950 A1 | | 6/2012 | Jagusztyn | |
| 2014/0109609 A1 | * | 4/2014 | Yoshida | F28F 17/005 62/290 |
| 2014/0293540 A1 | * | 10/2014 | Doe | F28B 1/00 361/696 |
| 2018/0058717 A1 | * | 3/2018 | Nagasaka | F24H 1/263 |

FOREIGN PATENT DOCUMENTS

| | | |
|---|---|---|
| JP | H11264686 A | 9/1999 |
| WO | WO03093751 A2 | 11/2003 |
| WO | WO2006083450 A2 | 8/2006 |

OTHER PUBLICATIONS

Communication Pursuant to Article 94(3) EPC for EP Application No. 16174732.4, dated Nov. 26, 2018, pp. 4.

* cited by examiner

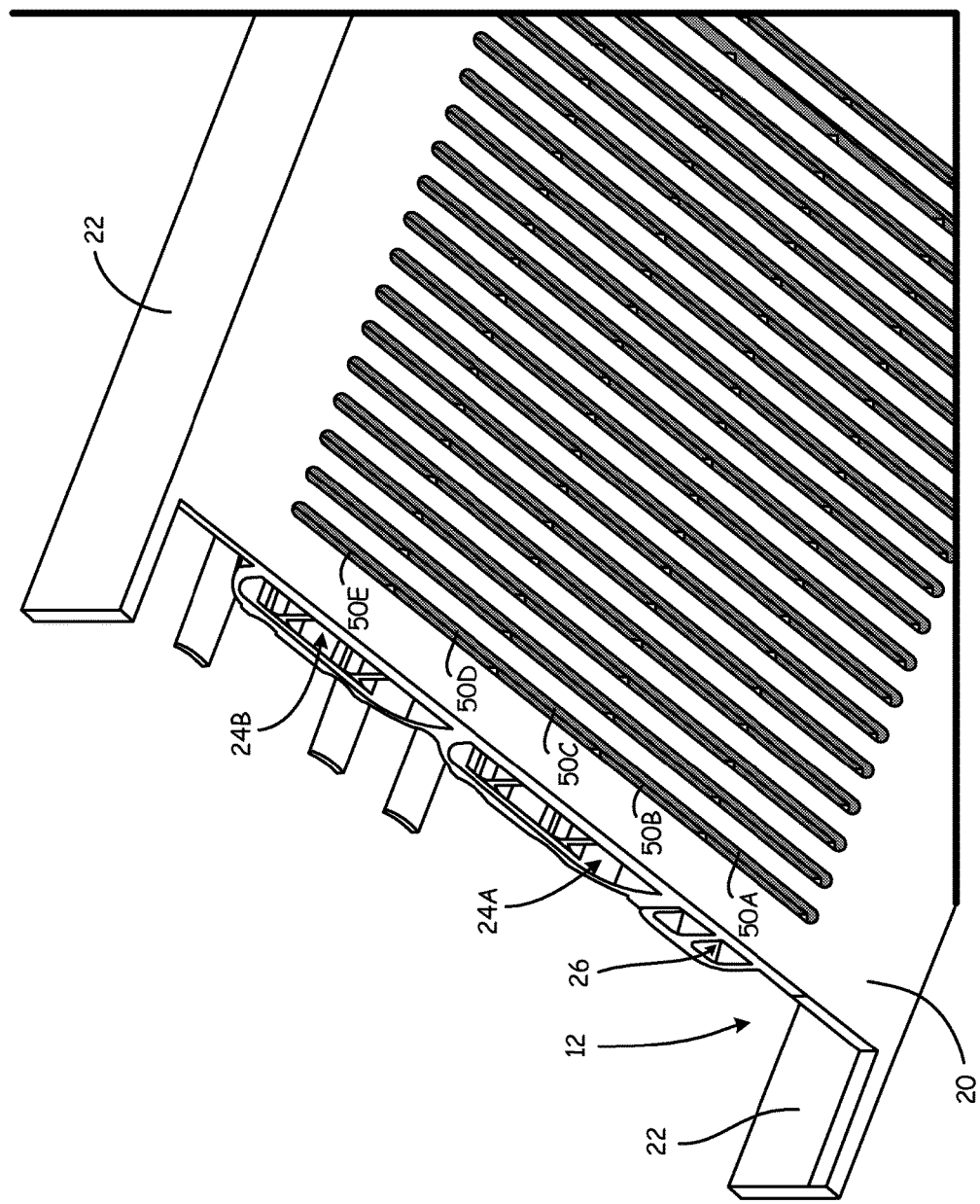

MINI-CHANNEL HEAT EXCHANGER TUBE SLEEVE

BACKGROUND

Mini-channel heat exchangers are used in many systems to reduce the temperature of a working fluid (e.g., hydraulic fluid, compressor bleed air, liquid coolant, water, refrigerant, etc.). Mini-channel heat exchangers are designed to be no heavier than necessary. This is particularly true for mini-channel heat exchangers used in the aerospace industry. One way of reducing weight of the mini-channel heat exchanger is by forming the mini-channel heat exchanger from as thin of a material as possible.

If the material is too thin, however, the high temperature working fluid flowing through the mini-channel heat exchanger can impart transient thermal stresses to the mini-channel heat exchanger, which can weaken the mini-channel heat exchanger's structure. This can increase the risk of the mini-channel heat exchanger being damaged during operation. One way to decrease the risk of damage from transient thermal stresses is to thicken the material that the mini-channel heat exchanger is formed from, but this can result in unnecessary weight increase. It is, therefore, desirable to optimize the thickness of the material forming the mini-channel heat exchanger without adding unnecessary weight.

SUMMARY

According to one embodiment of this disclosure, a heat exchanger tube assembly includes a tube. The tube includes a first end, a second end disposed opposite from the first end, an outer surface, and an inner surface defining an interior space. A plurality of channels are formed within the interior space. A first sleeve is fixed to the outer surface of the tube near the first end and a second sleeve is fixed to the outer surface of the tube near the second end.

According to another embodiment of this disclosure, a heat exchanger assembly includes a plurality of adjacent tubes. Each of the tubes includes a first end, a second end disposed opposite from the first end, an outer surface, and an inner surface defining an interior space. The tube further includes a plurality of channels formed within the interior space. A first sleeve is fixed to the outer surface of a first tube belonging to the plurality of adjacent tubes. A second sleeve is fixed to the outer surface of the first tube. A first manifold body is configured to receive a first portion of the first tube. A second manifold body is configured to receive a second portion of the first tube.

According to a further embodiment of this disclosure, a method of constructing a heat exchanger includes the step of coating an outer surface of a tube with a flux material. The method further includes the step of coating an inner surface of a sleeve with the flux material. The method additionally includes the step of positioning the inner surface of the sleeve about the outer surface of the tube, in which a first gap is formed therebetween. The method also includes the step of heating the tube and sleeve to a brazing temperature and filling the first gap with a filler metal.

BRIEF DESCRIPTION OF THE DRAWINGS

FIG. 2B is a bottom perspective view of the mini-channel heat exchanger manifold of FIG. 2A.

DETAILED DESCRIPTION

Figure 1:
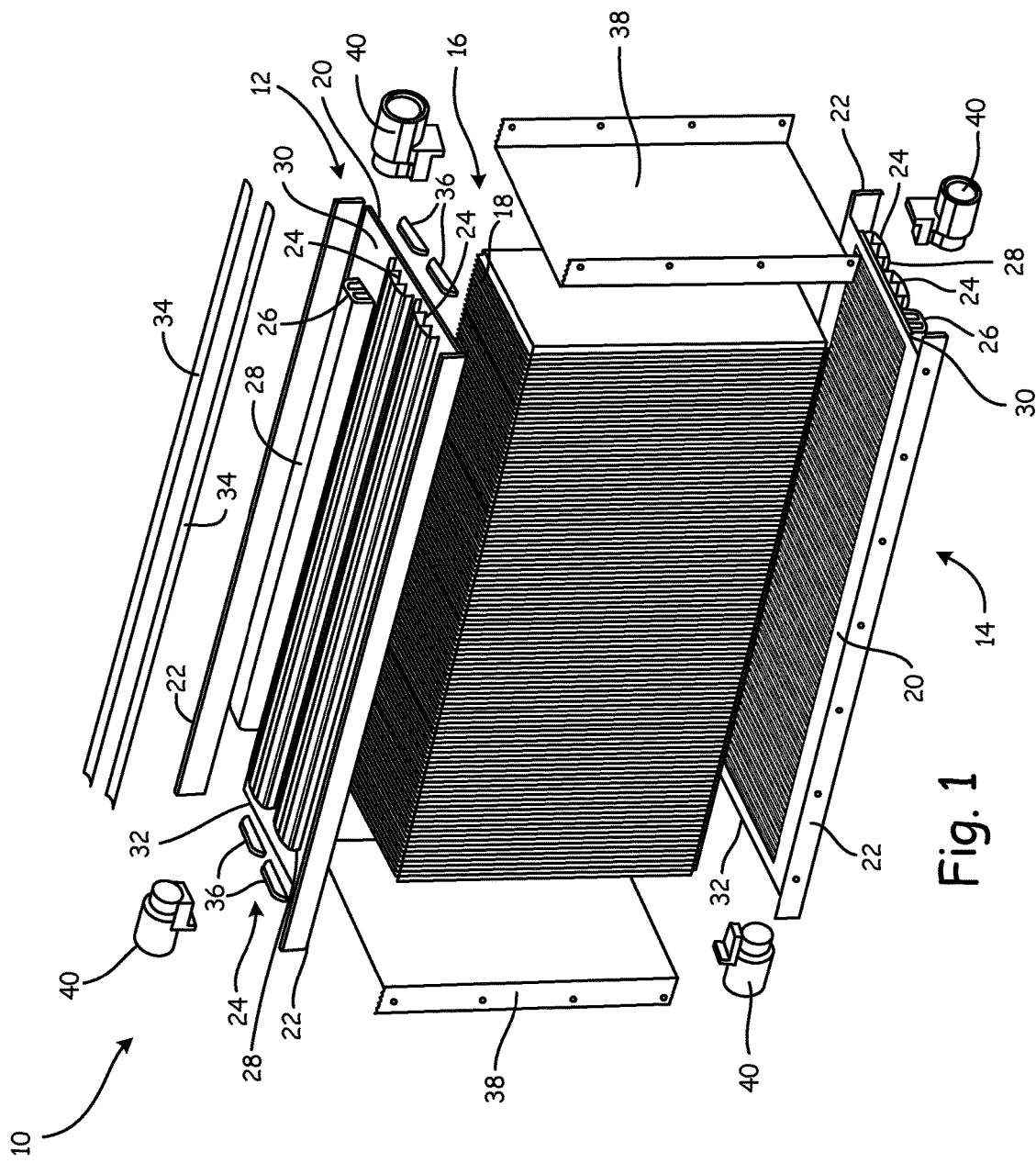
FIG. 1 is an exploded view of a mini-channel heat exchanger.

FIG. 1 is an exploded view of mini-channel heat exchanger 10. FIG. 1 illustrates first manifold 12, second manifold 14, and heat exchanger core 16, which includes mini-channel tubes 18. Both first manifold 12 and second manifold 14 include inner surface 20, side flanges 22, chambers 24, fluid channel 26, outer surface 28, first end 30, second end 32, outer surface plugs 34, side plugs 36, end panel 38, and liquid fittings 40.

First manifold 12 is disposed opposite second manifold 14 so inner surface 20 of first manifold 12 and inner surface 20 of second manifold 14 face each other. Heat exchanger core 16 is disposed between first manifold 12 and second manifold 14 so mini-channel tubes 18 of heat exchanger core 16 extend in length between first manifold 12 and second manifold 14. Each mini-channel tube 18 is fluidically connected to both first manifold 12 and second manifold 14. As shown in FIG. 1, first manifold 12 and second manifold 14 are substantially identical to each other. As a result, those components discussed with respect to first manifold 12 are equally applicable to second manifold 14.

Inner surface 20 of first manifold 12 is rectangular and side flanges 22 are connected to inner surface 20. Side flanges 22 extend perpendicular to inner surface 20. Chambers 24 and fluid channel 26 are formed between inner surface 20 and outer surface 28 and extend from first end 30 to second end 32. Chambers 24 and fluid channel 26 are discussed further below with reference to FIGS. 3A-3C. Inner surface 20, side flanges 22, fluid channel 26, and outer surface 28 can all be formed as single extruded piece, or as a single casted piece. Outer surface plugs 34 seal outer surface 28 and side plugs 36 seal chambers 24.

Two end panels 38 extend between first manifold 12 and second manifold 14 with heat exchanger core 16 being disposed between end panels 38. Both end panels 38 are connected to side flanges 22 of first manifold 12 and side flanges 22 of second manifold 14. End panels 38, along with first manifold 12 and second manifold 14, can form a supportive frame for heat exchanger 10. Two of liquid fittings 40 are connected to fluid channel 26 of first manifold 12, with one of liquid fittings 40 connected to each end of fluid channel 26 of first manifold 12. Two liquid fittings 40 are also connected to fluid channel 26 of second manifold 14, with one of liquid fittings 40 connected to each end of fluid channel 26 of second manifold 14. During operation, pressurized fluid enters heat exchanger 10 through each of liquid fittings 40 connected to fluid channel 26 of first manifold 12. After traveling through mini-channel tubes 18 of heat exchanger core 16, the pressurized fluid exits heat exchanger 10 through liquid fittings 40 connected to fluid channel 26 of second manifold 14.

First manifold 12 and second manifold 14 can be formed from aluminum alloys 6063, 31104, 6951, or any other metal or material possessing the necessary strength and thermal properties to withstand the operating pressures and temperatures of heat exchanger 10. Mini-channel tubes 18 of heat exchanger core 16 can be formed from any of the materials stated above or any other metal or material possessing the necessary strength to withstand the operating pressures of heat exchanger 10 and the necessary thermal conductivity to meet the heat transfer requirements of heat exchanger 10. Air fins (not shown) connected to mini-channel tubes 18 can be formed from any of the materials stated above or any other metal or material possessing the necessary thermal conductivity to meet the heat transfer requirements of heat exchanger 10.

Figure 2A:
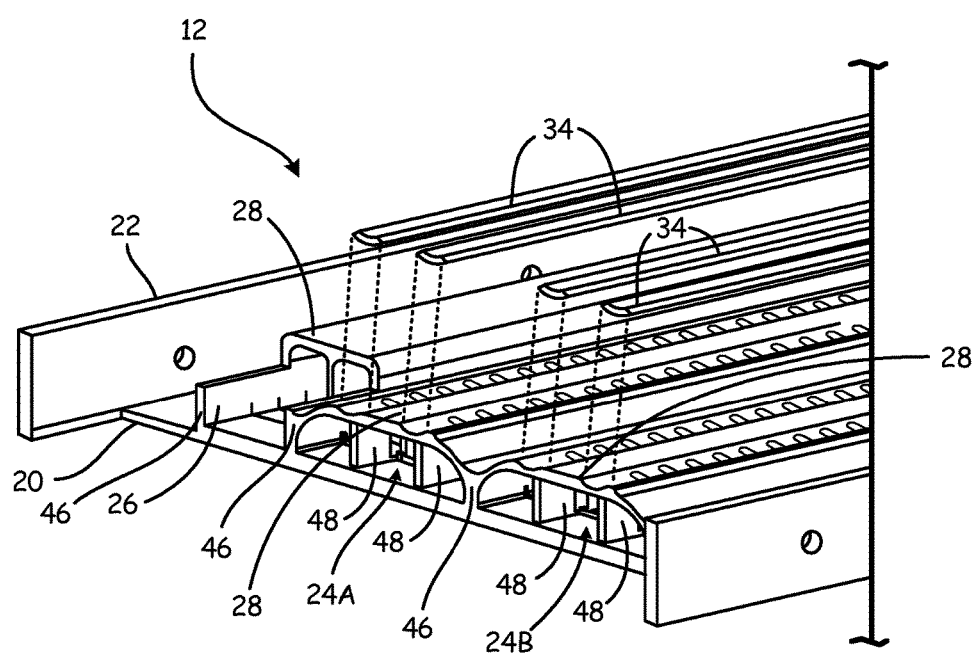
FIG. 2A is a partially exploded top perspective view of a mini-channel heat exchanger manifold having slots configured to receive a mini-channel tube.

FIG. 2A is a top perspective view of first manifold 12. FIG. 2A illustrates chamber 24A, chamber 24B, dividing walls 46, and baffles 48. FIG. 2B is bottom perspective view of first manifold 12 and illustrates slots 50A, 50B, 50C, 50D, and 50E, collectively referred to as slots 50.

As shown in FIG. 2A, chamber 24A, chamber 24B, and fluid channel 26 are defined in part by inner surface 20 and outer surface 28. Inner surface 20 is rectangular and outer surface 28 has a generally arched profile. Chamber 24A, chamber 24B, and fluid channel 26 are separated by dividing walls 46. Dividing walls 46 are solid and prevent fluid from flowing directly between chamber 24A, chamber 24B, and fluid channel 26. Dividing walls 46 also provide structural support to first manifold 12. Baffles 48 are disposed within chamber 24A and chamber 24B. Baffles 48 provide structural support for first manifold 12 and do not prevent fluid from flowing within either chamber 24A or chamber 24B. Baffles 48 can be integral with inner surface 20 and outer surface 28 or can be formed from an insert brazed to first manifold 12.

As shown in FIG. 2B, inner surface 20 defines a plurality of slots 50 which are dimensioned to receive a portion of mini-channel tubes 18. First manifold 12 includes multiple rows of slots 50, which extend between side flanges 22. First slot 50A is aligned with fluid channel 26; second slot 50B and third slot 50C are aligned with chamber 24A; and fourth slot 50D and fifth slot 50E are aligned with chamber 24B. As shown, each row includes five slots 50 but, other embodiments of first manifold 12 can include other numbers of slots 50.

Figure 3A:
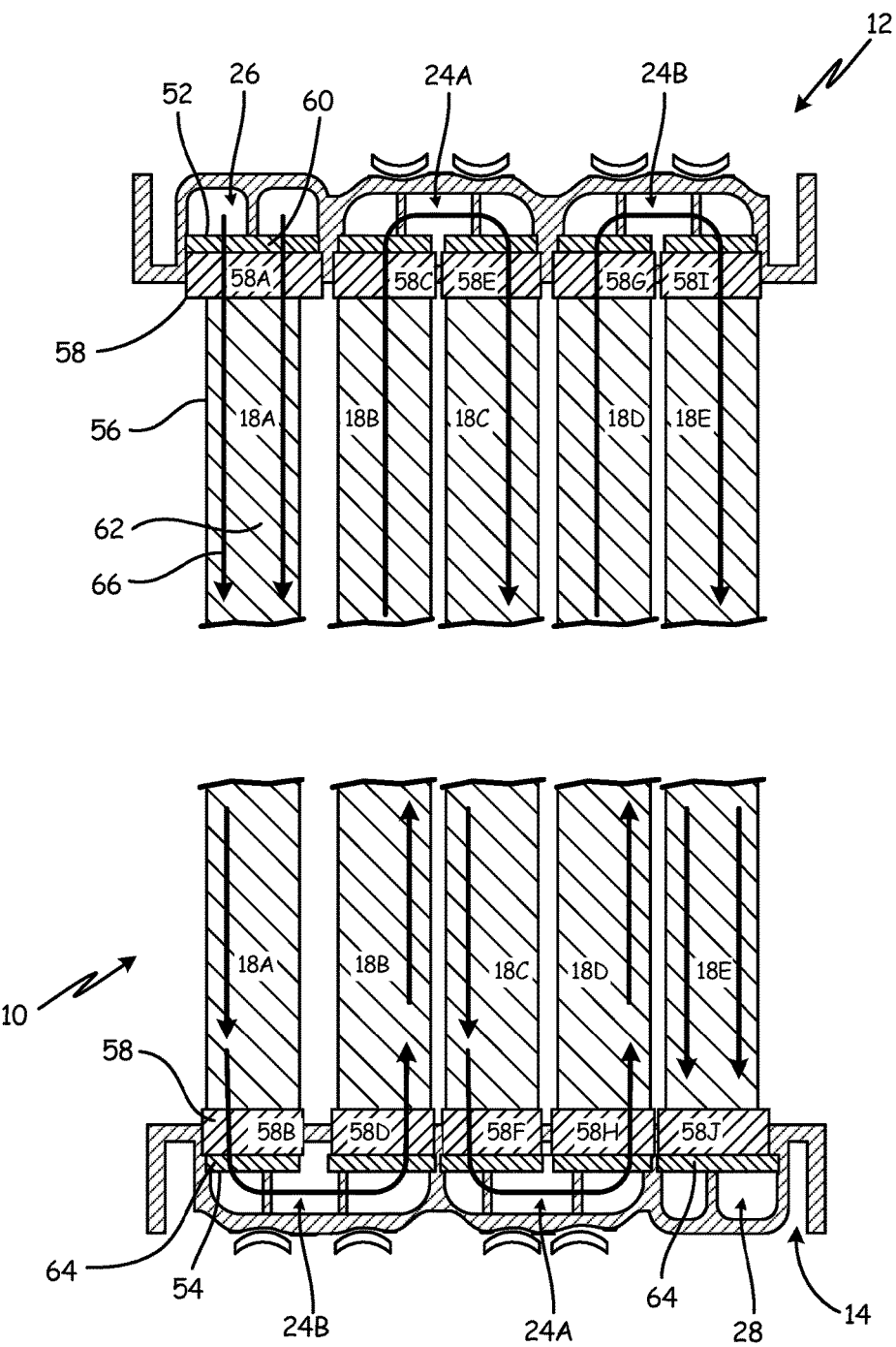
FIG. 3A is a partial sectional view of the mini-channel heat exchanger taken along line 3-3 having the mini-channel tubes inserted in a first and second manifolds.

FIG. 3A is a partial sectional view of heat exchanger 10 taken along line 3-3 of FIG. 1. FIG. 3A illustrates first end 52, second end 54, outer surface 56, sleeve 58, first portion 60, second portion 62, and third portion 64 of mini-channel tube 18. FIG. 3A also illustrates working fluid 66.

Mini-channel tubes 18 include first end 52 and second end 54. Outer surface 56 of mini-channel tube 18 spans between first end 52 and second end 54. First end 52 is disposed within one of slots 50 of first manifold 12 and second end 54 is disposed within one of slots 50 of second manifold 14. Sleeves 58 are located on mini-channel tubes 18 near first end 52 and second end 54, respectively. As shown, with respect to mini-channel tube 18A, for example, first portion 60 of mini-channel tube 18A extends from first end 52 to sleeve 58A, second portion 62 of tube 18A extends in length from sleeve 58A to sleeve 58B, and third portion 64 of tube 18A extends in length from sleeve 58B to second end 54. Second portion 62 of mini-channel tube 18A has a substantially greater length than either first portion 60 or second portion 62. As shown, first portion 60 of mini-channel tube 18A is disposed within first manifold 12 and third portion 64 of mini-channel tube 18A is disposed within second manifold 14. As shown, an end of sleeve 58A and an end of sleeve 58B each abut inner surface 20 of first manifold 12 and second manifold 14, respectively. Sleeves 58 effectively increase the thickness of mini-channel tube 18 where they are attached. Sleeves 58 can be made from an aluminum alloy such as aluminum alloys 6063, 31104, and 6951.

Figure 3B:
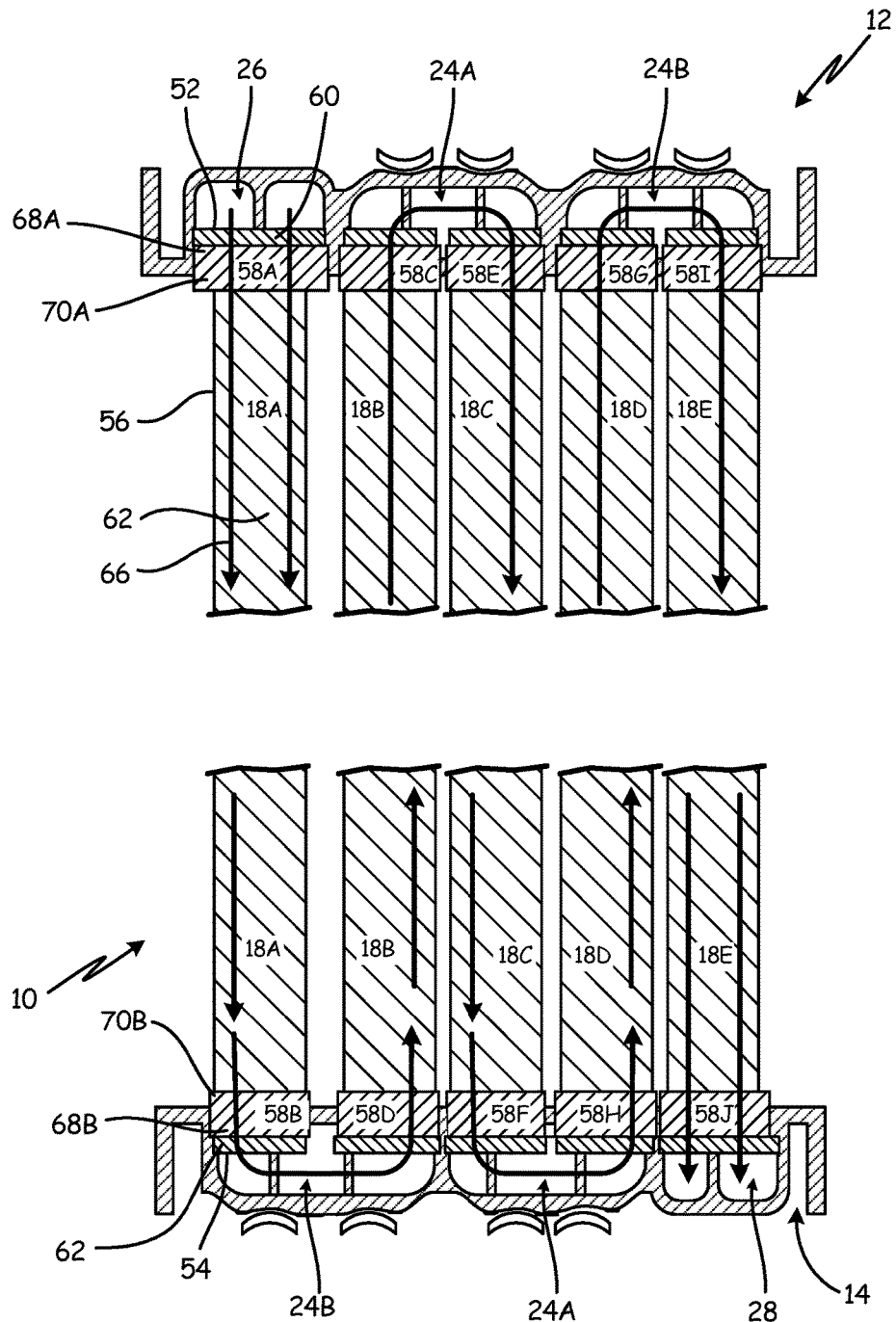
FIG. 3B is a partial sectional view of an alternative embodiment of the multi-channel heat exchanger of FIG. 3A taken along line 3-3 having sleeves of the mini-channel tubes inserted in the first and second manifolds.

FIG. 3B is a partial sectional view of heat exchanger 10 taken along line 3-3 and shows an alternative embodiment of heat exchanger 10. FIG. 3B illustrates first portion 68A and second portion 70A of first sleeve 58A. FIG. 3B also illustrates first portion 68B and second portion 70B of second sleeve 58B.

As shown with respect to mini-channel tube 18A, for example, first portion 68A of sleeve 58A is disposed within first manifold 12 and second portion 70A of sleeve 58A is disposed between first manifold 12 and second manifold 14. Similarly, first portion 68B of sleeve 58B is disposed within second manifold 14 and second portion 70B is disposed between second manifold 14 and first manifold 12.

Figure 3C:
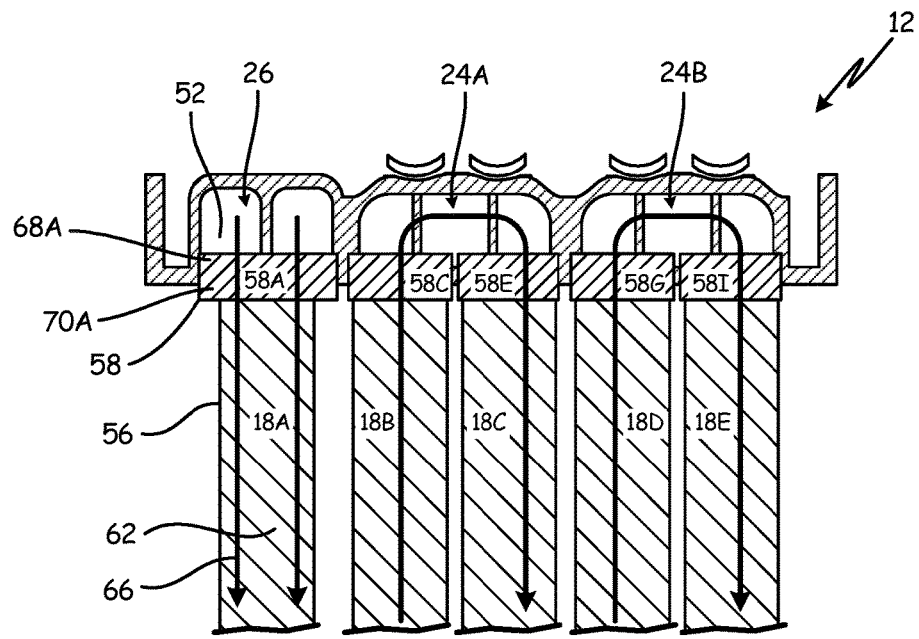
FIG. 3C is a partial sectional view of an alternative embodiment of the multi-channel heat exchanger of FIG. 3A taken along line 3-3 having an end of each of the sleeves flush with an end of the mini-channel tube.
Figure 3C:
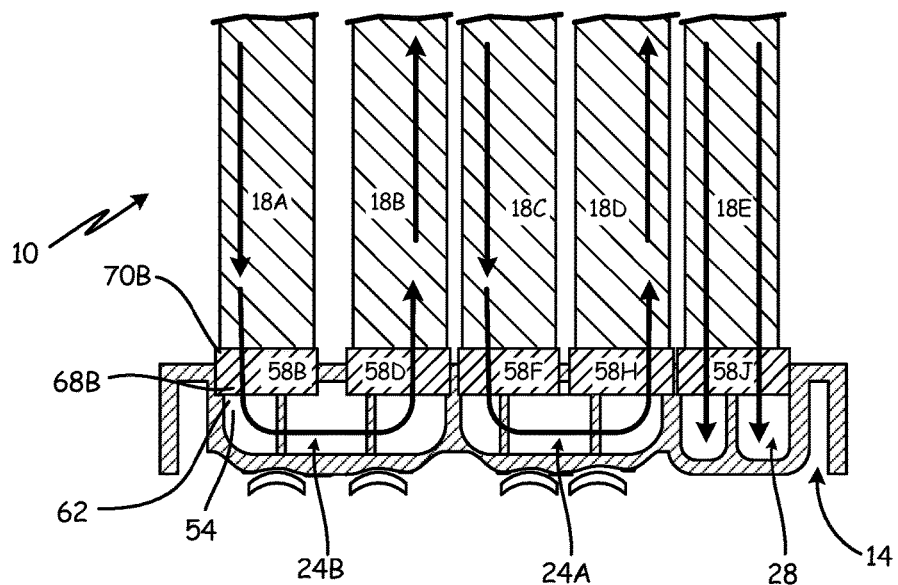

FIG. 3C is a partial sectional view of heat exchanger 10 taken along line 3-3 and shows a further embodiment of heat exchanger 10. As shown with respect to mini-channel tube 18A, for example, first portion 68A of sleeve 58A is flush with first end 52 of mini-channel tube 18 and first portion 68B of sleeve 58B is flush with second 54 of mini-channel tube 18.

In operation, working fluid 66 enters heat exchanger 10 through liquid fitting 40. Working fluid 66 flows from liquid fitting 40 to fluid channel 26. Fluid channel 26 on first manifold 12 is not fluidly connected to chamber 24A of first manifold 12 directly. As a result, working fluid 66 flows from fluid channel 26 through mini-channel tube 18A to chamber 24B of second manifold 14. Chamber 24B of second manifold 14 is not fluidly connected to chamber 24A of second manifold 14 directly. As a result, working fluid 66 flows from chamber 24B through mini-channel tube 18B to chamber 24A of first manifold 12. Chamber 24A of first manifold 12 is not fluidly connected to chamber 24B of first manifold 12 directly. As a result, working fluid 66 flows from chamber 24A through mini-channel tube 18C to chamber 24A of second manifold 14. Chamber 24A of second manifold 14 is not fluidly connected to fluid channel 26 of second manifold 14 directly. As a result, working fluid 66 flows from chamber 24A through mini-channel tube 18D to chamber 24B of first manifold 12 and through mini-channel tube 18E to fluid channel 26 of second manifold 14. Working fluid 66 flows through fluid channel 26 to liquid fitting 40 and exits heat exchanger 10.

Working fluid 66 enters heat exchanger 10 at a temperature that can range from about −40 degrees Celsius (−40 degrees Fahrenheit) to about 85 degrees Celsius (185 degrees Fahrenheit). As shown, heat exchanger 10 is configured to be a cooling heat exchanger. Cooling heat exchangers are used to cool working fluid 66 (e.g., hydraulic fluid, compressor bleed air, liquid coolant, water, refrigerant, etc.). As non-limiting examples, working fluid 66 can be used to cool electronics, engine components, air used in air conditioning systems, auxiliary power units, gearboxes, and many other components in an aircraft that require cooling.

In operation, the temperature of working fluid 66 decreases as it flows through mini-channel tubes 18. This is due, in part, to working fluid 66 being divided into channels within mini-channel tubes 18, which helps to turbulate working fluid 66. Turbulating working fluid 66 helps to increase the heat transferability of working fluid 66. While working fluid 66 flows through mini-channel tubes 18, cooling air passes over outer surface 56 of tubes 18 to help cool fluid 66. Cooling air can be ducted from a ram air source in an aircraft. When working fluid 66 exits heat exchanger 10 the temperature of fluid 66 is lower than when it entered heat exchanger 10.

During operation, first manifold 12, second manifold 14, and mini-channel tubes 18 are subjected to various levels of transient thermal stresses resulting from the high temperatures of working fluid 66. Transient thermal stresses imparted to first manifold 12, second manifold 14, and mini-channel tubes 18 can cause those components to expand and contract. This can weaken the connection of mini-channel tubes 18 to manifolds 12 and 14. If the connection between mini-channel tubes 18 and first or second manifolds 12 or 14 is weakened, then working fluid 66 can leak from heat exchanger 10. The thermal stresses can also weaken mini-channel tube 18 so a load imparted to tube 18 by manifold 12 or 14 can damage tube 18. For example, the load imparted by first manifold 12 or second manifold 14 can crush a weakened mini-channel tube 18.

The degree of transient thermal stress imparted to first manifold 12, second manifold 14, and mini-channel tubes 18 can differ depending on the temperature of working fluid 66 contacting each component. The differing levels of stress are a result of working fluid 66 being cooled as it passes through mini-channel tubes 18. For example mini-channel tube 18A can be subjected to a higher thermal stress than mini-channel tube 18E. This is because mini-channel tube 18A is near the point of entry for working fluid 66 and thus receives fluid 66 at a higher temperature. Mini-channel tube 18E, conversely, leads working fluid to the outlet of heat exchanger 10. Through operation of heat exchanger 10, working fluid 66 is substantially cooled by the time it reaches mini-channel tube 18E. Thus, mini-channel tube 18E, and the portion of first manifold 12 and second manifold 14 adjacent tube 18E are subjected to lower transient thermal stresses than mini-channel tube 18A and those portions of first manifold 12 and second manifold 14 adjacent tube 18A.

Figure 4A:
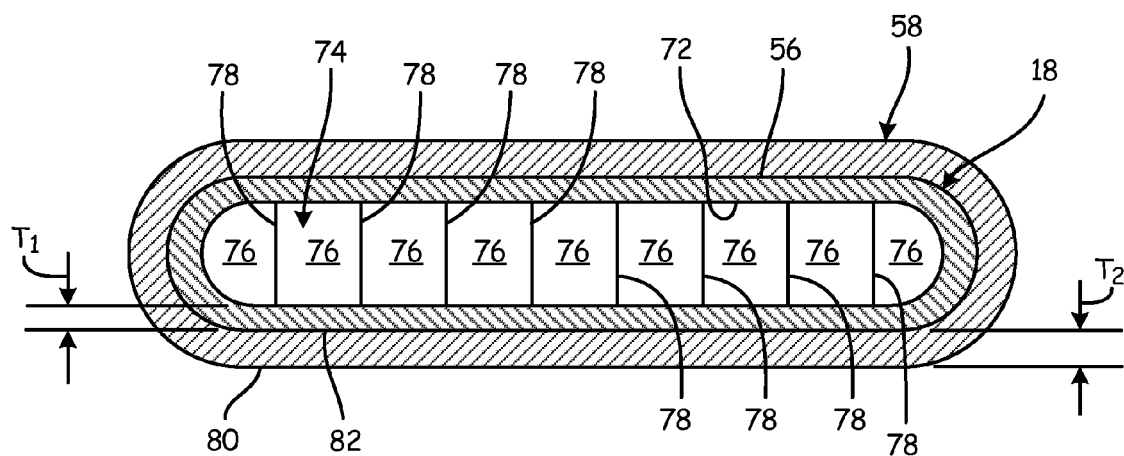
FIG. 4A is a sectional view of the mini-channel heat exchanger tube having the sleeve attached.
Figure 4B:
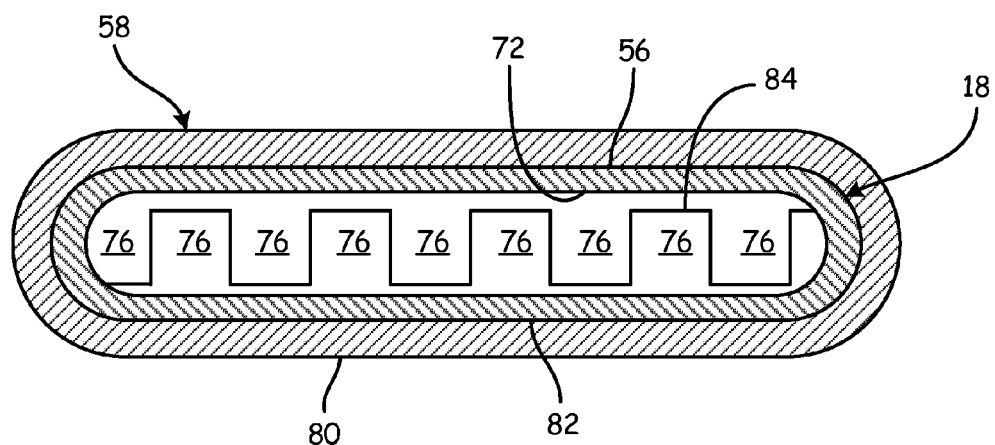
FIG. 4B is a sectional view of a mini-channel heat exchanger tube having a plurality of channels formed from a brazed insert.

FIG. 4A is a sectional view of mini-channel tube 18 having sleeve 58 attached. FIG. 4A illustrates several components of mini-channel tube 18 including inner surface 72, inner passage 74, channels 76 and ribs 78. FIG. 4A also illustrates outer surface 80 and inner surface 82 of sleeve 58. FIG. 4B shows another embodiment of mini-channel tube 18 where channels 76 are formed from insert 84. Insert 84 is brazed to mini-channel tube 18.

Mini-channel tube 18 includes outer surface 56 and inner surface 72 and thickness T1 is defined therebetween. As an example, mini-channel tube 18 can have a thickness of about 0.254 millimeters (0.010 inches), Inner surface 72 extends from first end 52 to second end 54 and defines inner passage 74. Channels 76 are formed by ribs 78, which extend from one side of mini-channel tube 18 to an opposite side. As shown, nine channels are formed but in other embodiments of mini-channel tube 18 any other number of channels 76 can be formed. Mini-channel tube 18 can be formed through an extrusion process.

Sleeve 58 includes outer surface 80 and inner surface 82 and thickness $T_2$ is defined therebetween. Thickness $T_2$ can range from about 0.254 mm to about 0.762 mm (0.030 inches). Thus, thickness $T_2$ can be equivalent to thickness $T_1$ of mini-channel tube 18 or can be as much as three times greater than the thickness of tube 18.

As shown above, with respect to FIGS. 3A and 3B, heat exchanger 10 includes a plural number of sleeves 58. Each mini-channel tube 18 can include two sleeves 58. For example, mini-channel tube 18A includes sleeves 58A and 58B. Sleeves 58A and 58B can have the same thickness or can have different thicknesses. In further embodiments of heat exchanger 10, sleeve 58C on tube 18B can have a different thickness than either sleeve 58A or 58B. Additionally some of mini-channel tubes 18 can be configured not to include any of sleeves 58.

Sleeve 58 can be casted, machined, milled, or extruded. Sleeve 58 can be fixed to mini-channel tube 18 many different ways. For example, sleeve 58 can be fitted to mini-channel tube 18, bolted to tube 18, or brazed to tube 18. A method of brazing sleeve 58 to mini-channel tube 18 is discussed more thoroughly below.

Figure 5:
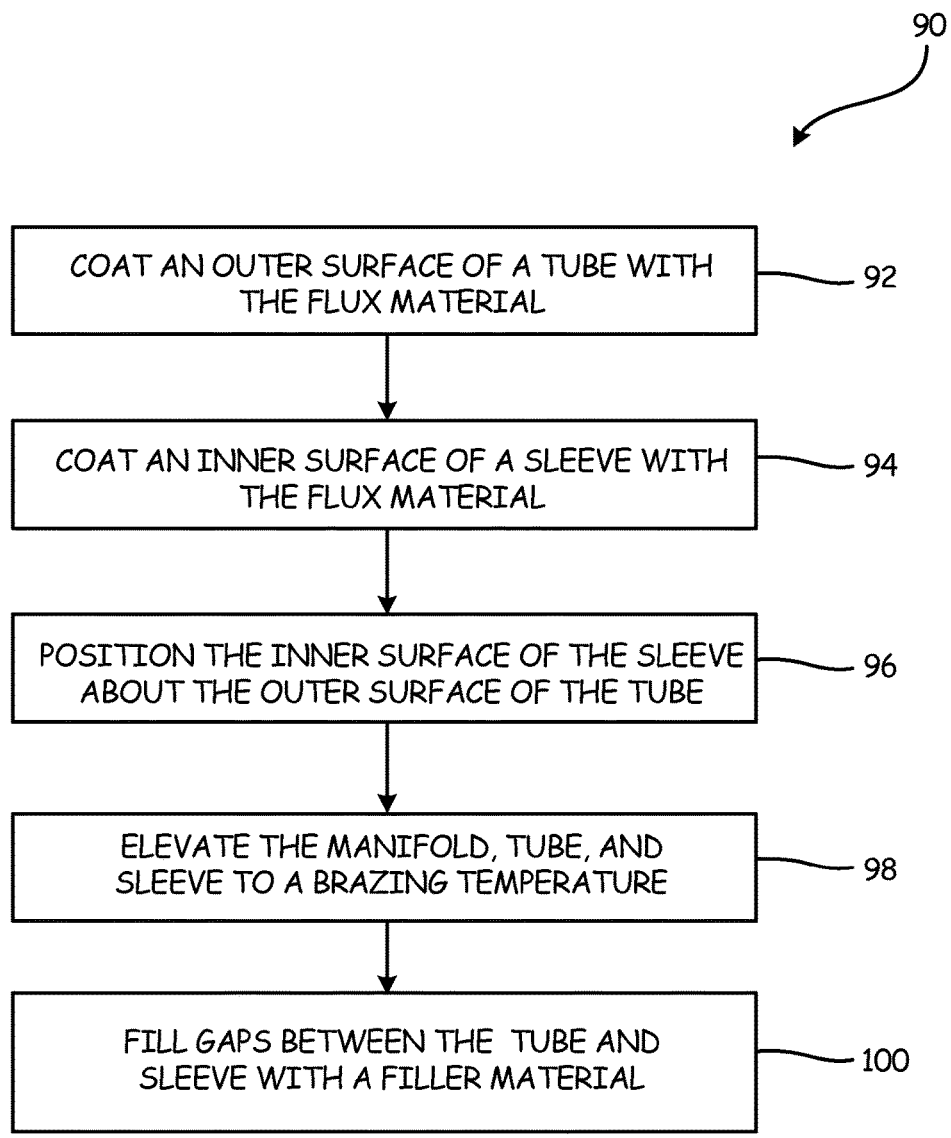
FIG. 5 is a flow diagram illustrating a method of assembling a mini-channel heat exchanger.

FIG. 5 is a flow diagram illustrating method 90 of constructing heat exchanger 10. Method 90 includes coating step 92, coating step 94, positioning step 96, heating step 98, and filling step 100.

In coating step 92, outer surface 56 of mini-channel tube 18 is coated with a flux material. Flux materials help to prevent oxide formation on surfaces during a brazing process. Many flux materials are known in the art. A proper flux material can be chosen depending on the temperature mini-channel tube 18 will be exposed to during the brazing process. In coating step 94, inner surface 82 of sleeve 58 is coated with a flux material. The flux material can be the same material used in coating step 92. In positioning step 96, inner surface 82 of sleeve 58 is positioned around outer surface 56 of mini-channel tube 18. A gap is formed between inner surface 82 and outer surface 56 so they do not contact each other. In heating step 98, mini-channel tube 18 and sleeve 58 are heated to a brazing temperature. Heat can be supplied, for example, by a handheld torch. The specific brazing temperature depends on the brazing material used in filling step 100. In filling step 100, the gap between outer surface 56 of mini-channel tube 18 and inner surface 82 of sleeve 58 is filled with molten filler metal. The filler metal fills in the gap and solidifies thus, forming a brazed joint between mini-channel tube 18 and sleeve 58. The filler material can, alternatively, be a powder that deposited in the gap and heated. Additional steps can include coating one of slots 50 with flux material and positioning mini-channel tube 18 or sleeve 58 within slot 50. Filling material can be deposited within the gap formed therebetween and the assembly can be elevated to a brazing temperature.

There are many reasons to include sleeve 58 on mini-channel tube 18 including the following non-limiting reasons. First, by effectively thickening mini-channel tube 18 where sleeve 58 is located, tube 18 is strengthened. As described above, sleeves 58 are generally located near first manifold 12 and second manifold 14. Those regions on mini-channel tube 18 where sleeves 58 are located can be most susceptible to damage caused by the expansion and contraction of first manifold 12 and second manifold 14. Therefore, strengthening mini-channel tube 18 with sleeves 58 in those regions can help to prevent mini-channel tube 18 from being damaged during operation of heat exchanger 10.

Another reason to use sleeves 58 is because they can help strengthen the structure of heat exchanger 10 as a whole. In the configuration of heat exchanger 10 shown in FIG. 3A, for example, first manifold 12 and second manifold 14 are brazed to multi-channel tubes 18. Additionally, inner surface surfaces 20 are brazed to sleeves 58. The surface of sleeve 58 that abuts inner surfaces 20 essentially acts as a platform on which to position manifolds 12 or 14.

Another reason to use sleeve 58 is because sleeve 58 effectively thickens mini-channel tube 18 only at locations where additional strength is required. Thus, weight is saved by not thickening mini-channel tube 18 as a whole. As stated above, the regions on mini-channel tube 18 where additional thickness can be desirable are those portions immediately adjacent manifolds 12 and 14 or those portions extending through slot 50. This is because those portions of mini-channel tube 18 are subjected to loads imparted by the expansion and contraction of first manifold 12 or second manifold 14. Third portion 64 of mini-channel tube 18 between sleeves 58 does not require additional thickness because that portion does not interact with first manifold 12 or second manifold 14. Therefore, thickening third portion 64 of mini-channel tube 18 would add unnecessary weight to tube 18.

Mini-channel tube 18 can be further optimized using sleeve 58 in that each tube 18 can be designed to be only as thick as required. As stated above, different sleeves 58 can have different thicknesses depending on the temperatures of working fluid 66 they are exposed too. For example, if sleeve 58E of FIGS. 3A and 3B is exposed to cooled working fluid 66, then sleeve 58E does not need to be as thick as sleeve 58A, which is exposed to hotter working fluid 66. This is because sleeve 58E will be exposed to lower transient thermal stresses than sleeve 58A. Thus, depending on the location of sleeve 58, its thickness can be adjusted to an optimal thickness. This can help to save weight as the instances of sleeves 58 being unnecessarily thick can be decreased.

Discussion of Possible Embodiments

The following are non-exclusive descriptions of possible embodiments of the present invention.

A heat exchanger tube assembly according to an exemplary embodiment of this disclosure, among other possible things includes a tube comprising: a first end; a second end disposed opposite from the first end; an outer surface; an inner surface defining an interior space; and a plurality of channels formed within the interior space; a first sleeve is fixed to the outer surface of the tube near the first end; and a second sleeve is fixed to the outer surface of the tube near the second end.

The heat exchanger tube assembly of the preceding paragraph can optionally include, additionally and/or alternatively, any one or more of the following features, configurations and/or additional components:

A further embodiment of the foregoing heat exchanger tube assembly, wherein a thickness of the first sleeve can be greater than or equal to a thickness of the tube.

A further embodiment of the foregoing heat exchanger tube assembly, wherein the thickness of the first sleeve can be no more than three times greater than the thickness of the tube.

A further embodiment of the foregoing heat exchanger tube assembly, wherein the thickness of the first sleeve can be no more than one and a half times greater than the thickness of the tube.

A further embodiment of the foregoing heat exchanger tube assembly, wherein the thickness of the first sleeve can be different than a thickness of the second sleeve.

A further embodiment of the foregoing heat exchanger tube assembly, wherein the first and second sleeves can be formed from an aluminum alloy.

A further embodiment of the foregoing heat exchanger tube assembly, wherein a first portion of the tube can extend between the first end of the tube and the first sleeve, a second portion of the tube can extend between the first sleeve and the second sleeve, and a third portion of the tube can extend between the second sleeve and the second end of the tube, and wherein the second portion of the tube can have a substantially greater length than a length of the first portion and a length of the second portion of the tube.

A further embodiment of the foregoing heat exchanger tube assembly, wherein an end of the first sleeve can be flush with the first end of the tube and an end of the second sleeve is flush with the second end of the tube.

A heat exchanger tube assembly according to an exemplary embodiment of this disclosure, among other possible things includes a plurality of adjacent tubes, each of the tubes comprising: a first end; a second end disposed opposite from the first end; an outer surface; an inner surface defining an interior space; and a plurality of channels formed within the interior space; a first sleeve fixed to the outer surface of a first tube belonging to the plurality of adjacent tubes; a second sleeve fixed to the outer surface of the first tube; a first manifold body configured to receive a first portion of the first tube; and a second manifold body configured to receive a second portion of the first tube.

The heat exchanger assembly of the preceding paragraph can optionally include, additionally and/or alternatively, any one or more of the following features, configurations and/or additional components:

A further embodiment of the foregoing heat exchanger assembly, wherein a thickness of the first sleeve can be greater than or equal to a thickness of the first tube.

A further embodiment of the foregoing heat exchanger assembly, wherein the thickness of the first sleeve can be no more than three times greater than the thickness of the first tube.

A further embodiment of the foregoing heat exchanger assembly, wherein the thickness of the first sleeve can be different than a thickness of the second sleeve.

A further embodiment of the foregoing heat exchanger assembly, wherein a first portion of the first sleeve can be disposed within the first manifold body and a second portion of the first sleeve can be disposed between the first manifold body and the second manifold body.

A further embodiment of the foregoing heat exchanger assembly, wherein a first portion of the second sleeve can be disposed within the second manifold body and a second portion of the second sleeve can be disposed between the second manifold body and the first manifold body.

A further embodiment of the foregoing heat exchanger assembly, wherein the heat exchanger can further comprise a third sleeve fixed to an outer surface of a second tube belonging to the plurality of adjacent tubes, wherein a thickness of the third sleeve is less than the thickness of the first sleeve.

A further embodiment of the foregoing heat exchanger assembly, wherein the heat exchanger can further comprise a third tube belonging to the plurality of adjacent tubes that does not include a sleeve.

A further embodiment of the foregoing heat exchanger assembly, wherein the plurality of channels can be defined by a plurality of integral ribs extending across the interior space of the tube.

A further embodiment of the foregoing heat exchanger assembly, wherein the plurality of channels can be defined by a brazed insert.

A method of constructing a heat exchanger according to an exemplary embodiment of this disclosure, among other possible things includes the steps of coating an outer surface of a tube with a flux material; coating an inner surface of a sleeve with the flux material; positioning the inner surface of the sleeve about the outer surface of the tube, wherein a first gap is formed therebetween; heating the tube and sleeve to a brazing temperature; and filling the first gap with a filler metal.

The method of the preceding paragraph can optionally include, additionally and/or alternatively, any one or more of the following features, configurations and/or additional components:

A further embodiment of the foregoing method, wherein the method can further comprise the steps of coating a slot defined by an inner surface of a manifold with the flux material; positioning one of the outer surface of the tube or the outer surface of the sleeve within the slot, wherein a second gap can be formed therebetween; and filling the second gap with a filler material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger assembly comprising:
   a plurality of adjacent tubes, each tube of the plurality of adjacent tubes comprising:
      a first end;
      a second end disposed opposite from the first end;
      an outer surface;
      an inner surface defining an interior space; and
      a plurality of channels formed within the interior space;
   a first sleeve fixed to the outer surface of a first tube near the first end of the first tube, the first tube belonging to the plurality of adjacent tubes;
   a second sleeve fixed to the outer surface of the first tube near the second end of the first tube;
   a second tube belonging to the plurality of adjacent tubes;
   a third tube belonging to the plurality of adjacent tubes;
   a first manifold body that bounds a first cavity, wherein the first manifold body has a first side and a second side;
   a plurality of first slots defined by the first manifold body configured to receive a first portion of the first tube, a first portion of the second tube, and a first portion of the third tube, wherein the first portion of the first tube includes the first end of the first tube;
   a second manifold body that bounds a second cavity;
   a plurality of second slots defined by the second manifold body configured to receive a second portion of the first tube, a second portion of the second tube, and a second portion of the third tube, wherein the second portion of the first tube includes the second end of the first tube;
   a first baffle disposed in the second manifold body between the first tube and the second tube, the first baffle being configured to allow fluid flow from the first tube to the second tube; and
   a first wall disposed in the second manifold body between the second tube and the third tube, the first wall being configured to prevent fluid flow from the second tube to the third tube;
   wherein the first end of the first tube terminates within one of the plurality of first slots between the first side and the second side;
   wherein the first sleeve is adjacent to the first manifold body and entirely outside of the first cavity; and
   wherein a thickness of the second sleeve is less than a thickness of the first sleeve.

2. The heat exchanger tube assembly of claim 1, wherein the thickness of the first sleeve is greater than or equal to a thickness of the first tube.

3. The heat exchanger assembly of claim 2, wherein the thickness of the first sleeve is no more than three times greater than the thickness of the first tube.

4. The heat exchanger assembly of claim 2, and further comprising:
   a third sleeve fixed to an outer surface of the second tube belonging to the plurality of adjacent tubes, the second tube being adjacent to the first tube,
   wherein the first end of the second tube terminates within another one of the first plurality of slots;
   wherein the third sleeve is adjacent to the first manifold body and entirely outside of the first cavity; and
   wherein a thickness of the third sleeve is less than the thickness of the first sleeve.

5. The heat exchanger assembly of claim 1, wherein the plurality of channels are defined by a plurality of integral ribs extending across the interior space of each tube of the plurality of adjacent tubes.

6. The heat exchanger assembly of claim 1, wherein the plurality of channels are defined by a brazed insert.

7. A method of constructing the heat exchanger assembly of claim 1, the method comprising the steps of:
   coating an outer surface of the first tube with a flux material;
   coating an inner surface of the first sleeve with the flux material;
   positioning the inner surface of the first sleeve about the outer surface of the first tube, wherein a first gap is formed therebetween;
   heating the first tube and sleeve to a brazing temperature; and
   filling the first gap with a filler metal.

8. The method of claim 7, and further comprising:
   coating a slot defined by an inner surface of a manifold with the flux material;
   positioning one of the outer surface of the first tube or the outer surface of the first sleeve within the slot, wherein a second gap is formed therebetween; and
   filling the second gap with a filler material.

9. The heat exchanger assembly of claim 1, wherein an end of the first sleeve abuts the first manifold body.

10. The heat exchanger assembly of claim 1, further comprising:
   a second wall disposed in the first manifold body between the first tube and the second tube, the second wall being configured to prevent fluid flow from the first tube to the second tube; and
   a second baffle disposed in the first manifold body between the second tube and the third tube, the second baffle being configured to allow fluid flow from the second tube to the third tube.

* * * * *